(12) United States Patent
Gubb et al.

(10) Patent No.: US 6,447,683 B1
(45) Date of Patent: Sep. 10, 2002

(54) PATHOGEN DESTRUCTION PROCESS FOR BIOSOLIDS

(75) Inventors: Donald Michael Douglas Gubb, Oakland; David Isaac Jenkins, Kensingston, both of CA (US); Sambhunath Ghosh, Salt Lake City, UT (US); John Matthew Hake, Oakland, CA (US); Carlos De Leon, Berkeley, CA (US); David Robert Williams, Walnut Creek, CA (US)

(73) Assignee: Water Environment Research Foundation, Alexandria, VA (US)

( * ) Notice: Subject to any disclaimer, the term of this patent is extended or adjusted under 35 U.S.C. 154(b) by 11 days.

(21) Appl. No.: 09/685,458

(22) Filed: Oct. 9, 2000

(51) Int. Cl.$^7$ .................................................. C02F 3/00
(52) U.S. Cl. ...................................................... 210/613
(58) Field of Search ................................. 210/613, 601

(56) References Cited

U.S. PATENT DOCUMENTS

| | | | |
|---|---|---|---|
| 5,228,995 A | * 7/1993 | Stover | 210/150 |
| 5,525,228 A | 6/1996 | Dague et al. | |
| 5,525,229 A | * 6/1996 | Shih | 210/177 |
| 5,624,565 A | 4/1997 | Lefevre et al. | |
| 5,630,942 A | * 5/1997 | Steiner | 210/603 |
| 5,746,919 A | 5/1998 | Dague et al. | |
| 5,900,150 A | 5/1999 | Fayoux et al. | |

OTHER PUBLICATIONS

Aitken, Michael D., et al., Another look at thermophilic anaerobic digestion of wastewater sludge; Water Environment Research; vol. 64; Nov.–Dec. 1992; pp915–919.

Berg, Gerald, et al., Destruction by Anaerobic Mesophilic and thermophilic digestion of viruses and indicator bacteria indigenous to domestic sludges; Applied and Environmental Microbiology; vol. 39, #2; Feb. 1980; pp361–368.

Buhr, H.O. et al., The thermophilic anaerobic digestion process; Water Resource; vol. 2, 1977; pp129–143.

Farrell, Joseph B., et al., Influence of feeding procedures on microbial reductions and performance of anaerobic digestion; Journal WPCF; vol. 60, No. 5; May, 1988; pp635–644.

Gabb, Donald M.D. et al., Pathogen destruction efficiency in high temperature anaerobic digestion; WEFTEC 1999; Oct. 10, 1999; pp1–12.

(List continued on next page.)

Primary Examiner—Chester T. Barry
(74) Attorney, Agent, or Firm—Robert D. Varitz, P.C.

(57) ABSTRACT

A method of treating a waste stream comprising feeding a waste stream into a reactor constructed and arranged for a fast start and maintained in a thermophilic temperature regime of between about 50° C. and 62° C. for a HRT of less than or equal to 48 hours, wherein the reactor contents are maintained at a pH less than or equal to 6.5; drawing a portion of the contents of the reactor and feeding the drawn contents into a second reactor which is maintained in a mesophilic temperature regime of between about 28° C. to 38° C. for a HRT of at least thirteen days; and replacing the contents drawn from the first reactor with more waste from the waste stream. Alternately, the waste stream may be initially treated in a mesophilic reactor, followed by treatment in a thermophilic reactor, or a single stage thermophilic reactor may be used.

7 Claims, 3 Drawing Sheets

OTHER PUBLICATIONS

Garber, William F., Operating experience with thermophilic anaerobic digestion; Journal WPCF; vol. 54, No. 8; Aug. 1982; pp1170–1175.

Garber, William F., Certain aspects of anaerobic digestion of wastewater solids in the thermophilic range at the Hyperion treatment plant; Prog. Wa. Tech; vol. 8, No. 8; 1977; pp401–406.

Ghosh, Sambhunath, et al., Pilot– and full–scale two–phase anaerobic digestion of municipal sludge; Water Environment Research; vol. 67, No. 2; Mar.–Apr. 1995; pp206–214.

Ghosh, Sambhunath, et al., The Aciment® Process: An innovative approach to biogasification of municipal sludge; Proceeding of the First Biomass Conference; 1993; pp759–769.

Ghosh, Sambhunath, et al., Improved sludge gasification by two–phase anaerobic digestion; J. Envir. Eng., vol. 113, No. 6, Dec. 1987; pp1265–1284.

Ghosh, Sambhunath, et al., Stabilization of Sewage sludge by two–phase anaerobic digestion; EPA/600/S2–87; Sep. 1987; pp1–8.

Ghosh, Sambhunath, et al., Comparative studies of temperature effects on single–stage and two–phase anaerobic digestion; Biotech & Bioeng Symp No. 17; 1986; pp365–377.

Ghosh, Sambhunath, et al., Anaerobic acidogenesis of wastewaster sludge; Journal WPCF; vol. 47, No. 1; Jan. 1975; pp30–45.

Han, Yue et al., Laboratory studies on the temperature phased anaerobic digestion of domestic primary sludge; Water Environment Research; vol. 59, No. 6; Sep.–Oct. 1997; pp1139–1143.

Han, Yue, et al., Temperature–phased anaerobic digestion of wastewater sludges; Water Science Tech; vol. 36, Nos. 6–7; 1997; pp367–374.

Huyard, Alain et al., A challenge for the two phase anaerobic digestion: To produce Class A biosolids and meet PFRP Equivalency; WEFTEC 98; Oct. 1998; pp1–11.

Huyard, Alain et al., Spiking a two phase anaerobic digestion pilor plant: An innovative approach to abtain a P.F.R.P. Eqivalency recommendation; WEFTEC 99; Oct. 1999; pp1–8.

Lee, Kun M., et al., Destruction of enteric bacteria and viruses during two–phase digestion; J. Water Pollution Control; vol. 61, No. 8; Aug. 1989; pp1421–1429.

Mitsdörffer, R., et al, Stabilization and disinfection of sewage sludge by two–stage anaerobic thermophilic/mesophilic digestion; Wat. Sci. Tech; vol. 22, No. 7/8; 1990; pp289–290.

Popova, N.M., et al., The present state of purification of twon sewage and the trend in research work in the city of Moscow; Advances in Water Pollution; vol. 2, 1964; pp97–118.

Stern, Gerald, et al., Sludge disinfection techniques; EPA, Cincinnati, Ohio; 1977; pp142–148.

Watanabe, Haruki, et al., Inactivation of pathogenic bacteria under mesophilic and thermophilic conditions; Water Sci. Tech; vol. 36, No. 6–7; 1997; pp25–32.

Zinder, Stephen, Thermophilic waste treatment systems; *Thermophiles*, John Wiley & Sons, New York; 1986; pp257–277.

* cited by examiner

PATHOGEN DESTRUCTION PROCESS FOR BIOSOLIDS

SPONSORSHIP

This work was supported by a grant from the Water Environment Research Foundation (Project No. 97-REM-2). The inventors acknowledge the assistance provided by Bio Vir Laboratories and the East Bay Municipal Utility District (EBMUD) laboratory staff.

FIELD OF THE INVENTION

This invention relates to the processing of wastewater, and particularly to a method for providing treatment to achieve Class A biosolids.

BACKGROUND OF THE INVENTION

Land application of treated wastewater sludge (biosolids) is controversial because the biosolids therein potentially contain human pathogens, i.e., some counties in California have banned the application of biosolids which meet the Environmental Protection Agency's (EPA) Class B pathogen reduction standards, as set forth in 40 CFR 503, which require a fecal coliform level of less than two million most-probable-number (MPN) per gram of total solids, but not Class A pathogens standards per 40 CFR 503. Wastewater treatment agency managers are concerned about the future of biosolids land applications in their states. EPA's Class A pathogen standards require the virtual elimination of pathogens in biosolids. In accordance with 40 CFR 503.32 (a)(5), Class A—alternate 3 and 40 CFR 503.32(a)(6)—alternate 4, EPA Class A pathogen requirements are met in biosolids when fecal coliform densities are less than 1,000 MPN per gram total solids; or when Salmonella densities are less than 3 MPN per four grams total solids. Additionally, enteric virus must be less than 1 plaque-forming unit per four grams of total solids, and helminth ova is less than one viable helminth ova per four grams of total solids. Meeting Class A standards will significantly increase the opportunity for biosolids recycling, however, known processes which achieve Class A pathogen levels in biosolids are generally cost prohibitive. The provision of a low-cost method of biosolids treatment, which will meet Class A standards will offer additional biosolids management options Known thermophilic anaerobic digestion processes are not classified as a Process to Further Reduce Pathogens (PFRP) under 40 CFR Part 503.

Anaerobic digestion has been one of the most widely used processes for the stabilization of primary and secondary sludges produced at municipal wastewater treatment facilities. The majority of applications of anaerobic digestion to wastewater sludges have been in the mesophilic temperature range, from 35° C. to 40° C. (95° F. to 104° F.). Anaerobic sludge digestion in the thermophilic temperature range from 45° C. to 65° C. (113° F. to 149° F.) has been practiced to only a limited extent.

The limited use of anaerobic digestion at temperatures above the mesophilic range is due to higher energy requirements to obtain the higher thermophilic temperature, poor process stability, increased odor, and lower quality supernatant (filtrate/centrate). The advantages of thermophilic anaerobic digestion over mesophilic anaerobic digestion have accrued from increased stabilization and methane production rates, and from improvements in sludge dewatering properties. Since the advent of the 40 CFR Part 503 Regulations, more studies have focused on the destruction of pathogenic organisms.

Thermophilic anaerobic digestion has an advantage of improving pathogen destruction, and has the potential to meet the pathogen quality requirements of EPA's Class A biosolids. While the economic disadvantages of thermophilic anaerobic digestion has outweighed the advantages of the process, the implementation of 40 CFR Part 503 and the use of a two-stage digestion system, having a thermophilic or mesophilic first-stage and a mesophilic or thermophilic second-stage, may negate the economic disadvantage.

Recent studies have introduced some improvement to the stability and performance of the thermophilic anaerobic digestion process. These improvements include:

Fast start-up method. The fast start-up method produces a more robust thermophilic culture that is relatively tolerant of temperature fluctuations and increases process stability.

Draw/fill operation. The draw/fill cycle improves pathogen removal by reducing the potential for short-circuiting.

Multiple-stage digestion. Multiple-stage reactors reduce the potential for short-circuiting, wherein flow exits the reactor before it should, provide a low pH environment in the first stage if methanogenesis is minimized or eliminated in this stage, which apparently enhances pathogen reduction; and, if the second-stage reactor is mesophilic, produce a higher quality sludge in terms of odor and supernatant.

Research has shown that pathogen destruction in municipal sludge digestion follows a typical time/temperature relationship, wherein higher temperatures require shorter exposure times for pathogen destruction. Data has been collected demonstrating survival rates of various pathogens in municipal sludge digestion. These data suggest that thermophilic digestion achieves pathogenic bacteria reduction rates about two orders of magnitude higher than mesophilic digestion, and may meet the pathogenic bacteria levels required for Class A sludge. EPA studies and full-scale research results indicate enhanced pathogen destruction in acid-phase digestion.

U.S. Pat. No. 5,525,228 to Dague et al., for Temperature-phased anaerobic waste treatment process, granted Jun. 11, 1996, describes a process having a long term hydraulic retention time (HRT) and which operates in a temperature range sufficient to Pasteurize the waste.

U.S. Pat. No. 5,624,565 to Lefevre et al., for Method of regulating aeration in a basin for biological treatment of Waste water, granted Apr. 29, 1997, describes a method which requires elimination of carbon in aerobiosis, nitrification and denitrification.

U.S. Pat. No. 5,746,919 to Dague et al., for Temperature-phased anaerobic waste treatment process, granted May 5, 1998, is a continuation of the '228 patent.

U.S. Pat. No. 5,900,150 to Fayoux et al., for Method of purifying waste water biologically, granted May 4, 1999, describes a treatment method which is conducted at temperatures between 25° C. and 40° C.

SUMMARY OF THE INVENTION

A method of treating a waste stream comprising feeding a waste stream into a reactor constructed and arranged for a fast start and maintained in a thermophilic temperature regime of between about 50° C. and 62° C., for a HRT of less than or equal to 48 hours, wherein the reactor contents are maintained at a pH of 6.5 or less; drawing a portion of the reactor contents and feeding into a second reactor which is maintained in a mesophilic temperature regime of between about 28° C. to 38° C. for a HRT of at least thirteen days; and replacing the volume of sludge drawn from the thermophilic reactor with more waste from the waste stream. Alternately, the waste stream may be initially treated in a mesophilic reactor, followed by treatment in a thermophilic reactor, or a single stage thermophilic reactor may be used.

An object of the invention is to meet Class A requirements with a thermophilic anaerobic digestion processes.

Another object of the invention is to provide a digestion process for fecal coliform, Salmonella, enteric virus and helminth ova reduction.

A further object of the invention is to provide a treatment method which will produce less methane than do prior art methods.

Another object of the invention is to provide a treatment method which will produce biosolids which are substantially pathogen-free and are suitable for application with respect to pathogen densities where ever commercial fertilizers or soil conditioners are used.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

Figure 1:
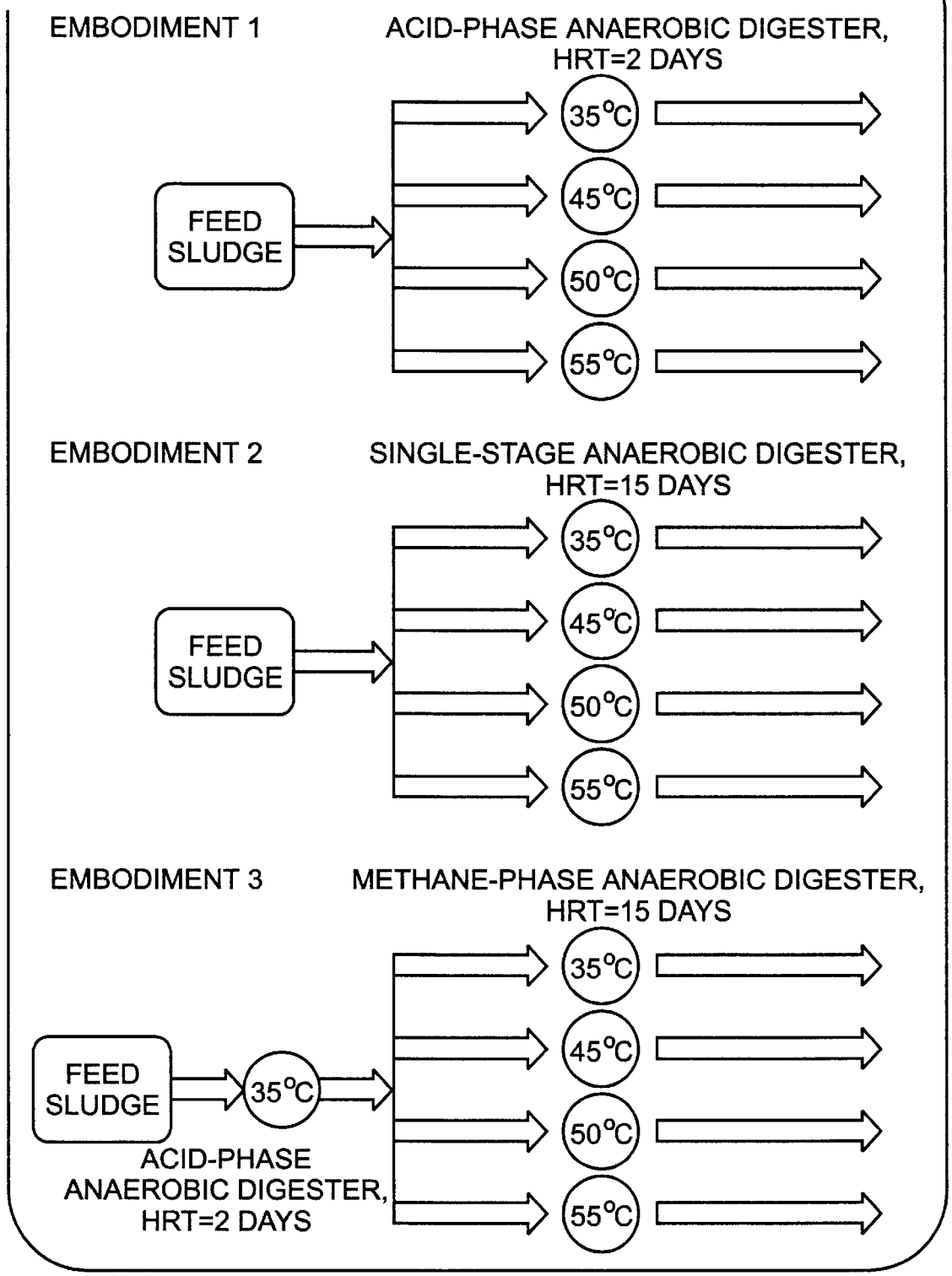
FIG. 1 is a flow chart depicting the various processes used to demonstrate the method of the invention.

This invention includes three embodiments of various thermophilic anaerobic digestion processes for disinfecting sludge, in some instances, to meet the EPA's Class A pathogen requirements, as set forth in 40 CFR Part 503, the requirement of which have been previously identified. Three embodiments of the invention, schematically represented in FIG. 1, are assessed for their ability to consistently meet fecal coliform requirements, and include: (1) a two-stage, thermophilic acid phase/mesophilic methane phase; (2) a single-stage thermophilic; and (3) a two-stage, mesophilic acid phase/thermophilic methane phase. Each process is evaluated at three different thermophilic temperatures, i.e., 45° C., 50° C., and 55° C., against a mesophilic control at 35° C. As used herein, a mesophilic temperature range includes temperatures between 35° C. and 40° C., while a thermophilic temperature range includes temperatures between 40° C. and 70° C. Temperatures above 70° C. are in a range which will pasteurize an organic material in thirty minutes per 40 CFR 503, Appendix B.7. Pasteurization is a physical, rather than a biological process. What is significant about the three embodiments of the invention is that the initial HRT is of short duration, and introduction of a waste stream into a thermophilic reactor is accompanied by a rapid start up, i.e., the contents of the reactor chamber are quickly brought up to the thermophilic temperature regime.

Experimental data using the methods of the invention was gathered in three phases. In Phase 1, the three embodiments of the invention were screened at bench-scale. Because the acid stage of the first embodiment was expected to provide significantly greater disinfection power than the mesophilic methane stage, only the acid stage was operated for evaluation purposes in Phase 1. Each embodiment was examined at or about three different thermophilic temperatures: 45° C., 50° C., and 55° C., referred to herein as Thermo 45, Thermo 50 and Thermo 55, respectively, against a mesophilic control at 35° C., referred to herein as Meso 35. In Phase 2, the better performing embodiments of Phase 1 were examined in more detail at bench-scale over a longer time period for assessment of process stability and actual pathogen destruction using feed sludges seeded with pathogens of concern. Phase 3 is a further continuation of the Phase 2 assessment at full-scale.

Figure 2:
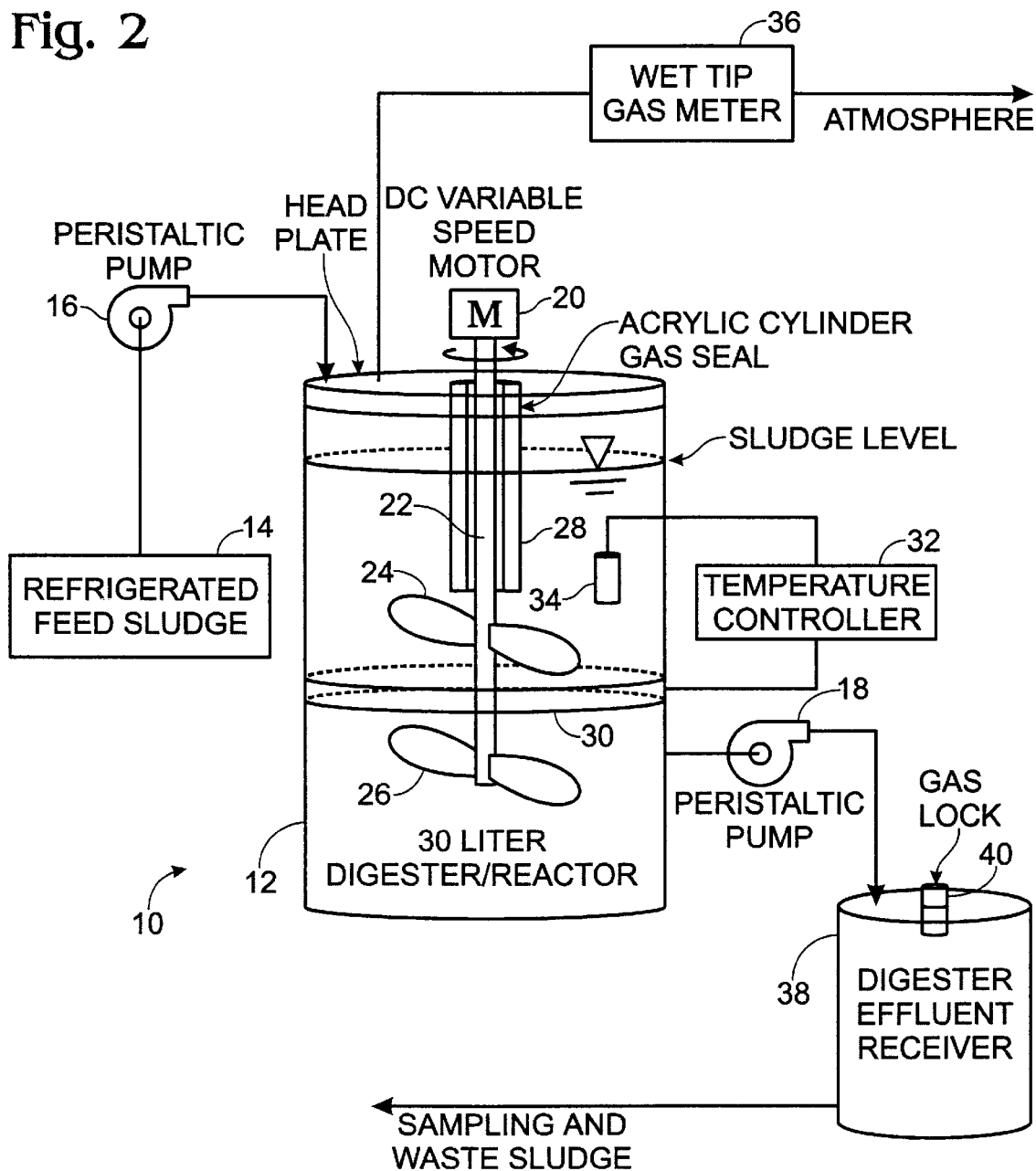
FIG. 2 is a schematic representation of the structure used to demonstrate the method of the invention.

The method of the invention was tested, as shown in FIG. 2, generally at 10, using laboratory-scale Plexiglas reactors 12 (digesters) with an operating capacity of approximately 30 liters. Peristaltic pumps 16, 18 control reactor influent and effluent flows, respectively.

The reactors were brought to thermophilic temperatures rapidly from a mesophilic seed sludge and operated in a draw/fill mode. As used herein, "rapidly" means that the seed sludge, at an initial temperature of about 35° C., was brought up to the thermophilic temperature regime in less than one day. At corresponding temperatures, single stage thermophilic processes (2) demonstrated greater fecal coliform removals than the first, thermophilic acid phase, stage of the two-stage process (1). Temperatures greater than 50° C. for embodiment 1, having a 2-day residence time, or 45° C. for embodiment 2, having a 15-day residence time, produced average effluent fecal coliform concentrations less than 1,000 MPN/g.TS (most probably number of pathogen/gram of total solids).

The reactor contents are mixed by an externally-mounted variable-speed DC motor 20 that turns a stainless steel shaft 22 and two 4-inch diameter propellers 24, 26. The mixing system is sealed and anaerobic conditions are maintained by a small tube 28 that covers the stainless steel shaft. Each reactor was heated by a 520-watt heat tape 30, such as Cole Parmer, E-36110-08. To avoid direct contact between the Plexiglas reactor walls and heat tape the exterior vertical area of the cylinders was covered with aluminum foil (not shown), which also distributes heat more evenly. Digester temperature is controlled by a proportional-response temperature controller 32, such as Dynasense Model 02149-20, which receives a signal from an 18-inch immersible RTD probe 34, such as Cole Parmer, E-08 117-74. As the temperature controller does not include a temperature display, temperatures are obtained from an external bimetal thermometer (not shown), and the heat tape output adjusted accordingly. Gas production was measured using a wet-tip gas meter 36, as supplied by Wet Tip Gas Meter Co. Reactor effluent was stored in a container 38 with a gas seal 40 that allowed gas to escape but prevented air from entering.

The various hydraulic residence times (HRT), two days for embodiment 1 and fifteen days for embodiment 2, were achieved by adjusting flow rates and pumping intervals. The 2-day HRT of the reactors was achieved for part of the test period by cycling one-fourth of the reactor volume twice a day. This feeding regime approximated batch behavior to maximize fecal coliform removal, however, a semi-continuous flow regime, having hourly feed cycles, was adopted for another part of the test period to better control reactor levels. Feed cycles for embodiment 2 were six hours apart. Feeding regimes include the many variations from batch-feed, intermittent fee and continuous-feed.

Reactor feed, the waste stream, was a mixture of the a main wastewater treatment plant's primary sludge (PS) and thickened waste activated sludge (TWAS). The PS was filtered through a 5×5 wire mesh, having a 63.2% open area, and mixed in a 1:1 volume ratio with TWAS. The feed was kept in a refrigerator at approximately 4° C. and was mixed using a submerged pump and recirculation loop prior to feeding. For embodiment 1, the feed lines were immersed in a pre-heating water bath at 35° C. to avoid large reactor temperature fluctuations. Pre-heating was not required for embodiment 2 because of the smaller feed volumes and longer feed cycle periods.

All tests were performed in accordance with procedures detailed in the Standard Methods for the Examination of Water and Wastewater. Reactor feed and effluent sludges were analyzed for a number of parameters to monitor digester performance. The average and standard deviation for each parameter were calculated for embodiment 1, and are shown in Table 1: "General Characteristics of Reactor Behavior" and for embodiment 2 in Table 2 "General Characteristics of Reactor Behavior." Digester performance, particularly for fecal coliform removal, is assessed as a function of temperature and hydraulic residence time.

TABLE 1

General characteristics of Reactor Behavior for Embodiment 1

| Parameter | # of Samples | | Reactor Operating Temperature | | | | Feed |
|---|---|---|---|---|---|---|---|
| | | | 35 | 45 | 50 | 55 | |
| Residence time (days)* | 56 | average | 3.3 | 2.4 | 2.8 | 2.7 | |
| | | st. dev. | 46 | 09 | 22 | 21 | |
| Temperature (° C.)* | 112 | average | 35 | 45 | 52 | 55 | |
| | | st. dev. | 2 | 2 | 3 | 3 | |
| Gas production (l/hr)** | 57 | average | 0.5 | 0.0 | 0.8 | 0.2 | |
| | | st. dev. | 0.3 | 0.1 | 0.6 | 0.5 | |
| Methane in gas produced (%)*** | 5 | average | 23.6 | 24.2 | 32.6 | 33.8 | |
| | | st. dev. | 29 | 38 | 51 | 70 | |
| pH*** | 58 | average | 584 | 607 | 658 | 665 | 5.88 |
| | | st. dev. | 0.20 | 0.12 | 0.17 | 0.16 | 0.13 |
| Total Alkalinity (mg CaCO$_3$/l)* | 26 | average | 3415 | 4162 | 4942 | 5085 | |
| | | st. dev. | 502 | 461 | 544 | 520 | |
| Volatile Acids (mg acetic acid/l)* | 26 | average | 6681 | 7477 | 7265 | 7462 | |
| | | st. dev. | 747 | 893 | 691 | 863 | |
| VFA/TALK ratio (mg acetic acid/mg CaCO$_3$)* | 26 | average | 1.98 | 1.81 | 1.48 | 1.47 | |
| | | st. dev. | 0.23 | 0.21 | 0.15 | 0.13 | |
| Acetic Acid (mg/l)**** | 7 | average | 2800 | 3471 | 3243 | 3571 | 1729 |
| | | st. dev. | 351 | 315 | 447 | 571 | 180 |
| Propionic Acid (mg/l)**** | 7 | average | 1757 | 1429 | 1514 | 1714 | 871 |
| | | st. dev. | 336 | 214 | 279 | 248 | 176 |
| Butyric Acid (mg/l)**** | 7 | average | 1250 | 1543 | 1486 | 1343 | 730 |
| | | st. dev. | 210 | 140 | 212 | 244 | 172 |
| Isobutyric Acid (mg/l)**** | 7 | average | 1189 | 2246 | 1430 | 729 | 380 |
| | | st. dev. | 1770 | 2675 | 1928 | 87 | 23 |
| Valeric Acid (mg/l)**** | 7 | average | 473 | 426 | 194 | 187 | 187 |
| | | st. dev. | 72 | 40 | 20 | 18 | 33 |
| Isovaleric Acid (mg/l)**** | 7 | average | 533 | 703 | 801 | 849 | 229 |
| | | st. dev. | 67 | 72 | 98 | 126 | 45 |
| Total Solids (%)* | 26 | average | 3.5 | 3.6 | 3.2 | 3.3 | 4.3 |
| | | st. dev. | 0.4 | 1.2 | 0.3 | 0.4 | 0.8 |
| Volatile Solids (%)* | 26 | average | 2.8 | 2.6 | 2.5 | 2.5 | 3.5 |
| | | st. dev. | 0.4 | 0.3 | 0.3 | 0.3 | 0.7 |
| Vol. Sol. Removal efficiency (%)* | 26 | average | 169% | 22.8% | 20.9% | 21.5% | |
| | | st. dev. | 11.1% | 21.1% | 12.2% | 10.9% | |
| Fecal Coliform (MPN/g TS)* | 26 | average | 15196 | 4445 | 905 | 449 | 309846 |
| | | st. dev. | 19661 | 5008 | 1538 | 1133 | 600687 |
| Fecal Log reduction* | 26 | average | 1.24 | 1.74 | 3.07 | 3.60 | |
| | | st. dev. | 0.65 | 0.61 | 1.11 | 1.05 | |

*58 Days
**57 Days
***31 Days
****39 Days

TABLE 2

General characteristics of Reactor Behavior for Embodiment 2

| Parameter | # of Samples | | Reactor Operating Temperature | | | | Feed |
|---|---|---|---|---|---|---|---|
| | | | 35 | 45 | 50 | 55 | |
| Residence time (days)* | 112 | average | 16.3 | 15.7 | 14.2 | 15.1 | |
| | | st. dev. | 4 | 4 | 4 | 4 | |
| Temperature (° C.)* | 222 | average | 34 | 45 | 51 | 56 | |
| | | st. dev. | 2 | 2 | 3 | 12 | |
| Gas production (l/hr)** | 113 | average | 1.5 | 2.0 | 1.5 | 1.5 | |
| | | st. dev. | 0.6 | 0.7 | 0.6 | 0.7 | |

TABLE 2-continued

General characteristics of Reactor Behavior for Embodiment 2

| Parameter | #of Samples | | Reactor Operating Temperature | | | | Feed |
|---|---|---|---|---|---|---|---|
| | | | 35 | 45 | 50 | 55 | |
| Methane in gas produced (%)*** | 20 | average | 61.4 | 58.1 | 54.1 | 55.0 | |
| | | st. dev. | 8.3 | 11.5 | 12.1 | 9.4 | |
| pH*** | 113 | average | 7.95 | 8.05 | 8.08 | 8.07 | 5.92 |
| | | st. dev. | 0.18 | 0.18 | 0.15 | 0.25 | 0.22 |
| Total Alkalinity (mg $CaCO_3$/l)* | 67 | average | 6769 | 6803 | 6661 | 6518 | |
| | | st. dev. | 437 | 475 | 386 | 534 | |
| Voltile Acids (mg acetic acid/l)* | 67 | average | 270 | 488 | 1525 | 2199 | |
| | | st. dev. | 260 | 465 | 733 | 1129 | |
| VFA/TALK ratio (mg acetic acid/mg $CaCO_3$)* | 67 | average | 0.04 | 0.07 | 0.23 | 0.34 | |
| | | st. dev. | 0.04 | 0.08 | 0.11 | 0.21 | |
| Acetic Acid (mg/l)**** | 58 | average | 280 | 460 | 578 | 982 | 1611 |
| | | st. dev. | 167 | 330 | 283 | 834 | 692 |
| Propionic Acid (mg/)**** | 58 | average | 61 | 95 | 796 | 948 | 786 |
| | | st. dev. | 95 | 118 | 457 | 447 | 438 |
| Butyric Acid (mg/l)**** | 58 | average | 28 | 27 | 40 | 89 | 602 |
| | | st. dev. | 14 | 8 | 37 | 147 | 406 |
| Isobutyric Acid (mg/l)**** | 58 | average | 67 | 93 | 156 | 252 | 298 |
| | | st. dev. | 25 | 31 | 64 | 148 | 118 |
| Valteric Acid (mg/l)*** | 58 | average | 26 | 25 | 40 | 45 | 98 |
| | | st. dev. | 4 | 1 | 25 | 19 | 65 |
| Isovaleric Acid (mg/l)**** | 58 | average | 28 | 31 | 76 | 158 | 188 |
| | | st. dev. | 16 | 19 | 74 | 174 | 134 |
| Total Solids (%)* | 67 | average | 2.2 | 2.2 | 2.2 | 2.2 | 4.2 |
| | | st. dev. | 0.3 | 0.3 | 0.3 | 0.4 | 1.0 |
| Volatile Solids (%)* | 67 | average | 1.4 | 1.4 | 1.5 | 1.5 | 3.2 |
| | | st. dev. | 0.2 | 0.2 | 0.2 | 0.2 | 0.8 |
| Vol. Sol. Removal efficiency (%)* | 67 | average | 42.8% | 44.1% | 40.2% | 38.5% | |
| | | st. dev. | 17.0% | 15.9% | 15.8% | 17.8% | |
| Fecal Coliforms (MPN/g TS)* | 58 | average | 1100 | 240 | 110 | 43 | 120000 |
| | | st. dev. | 1200 | 770 | 320 | 170 | 150000 |
| Fecal Log reduction | 58 | average | 1.94 | 3.07 | 3.69 | 4.16 | |
| | | st. dev. | 0.67 | 0.86 | 0.89 | 0.92 | |

*58 Days
**57 Days
***31 Days
****39 Days

Embodiment 1

Two-Stage Thermophilic Acid Phase/Mesophilic Methane Phase Digestion

Embodiment 1 was evaluated using only the first stage (thermophilic acid phase) of the two-stage process because it was expected that this is where the greatest pathogen destruction would occur. Reactor temperatures appeared to have a proportional relationship with total alkalinity (TALK), pH, methane production, fecal coliform removal, and an inversely proportional relationship with volatile fatty acids (VFA)/TALK ratio, as shown in Table 1. TALK and pH levels were interrelated with the proportion of methane in gas production —alkalinity is a by-product of methanogenesis in that it results in the consumption volatile of fatty acids. As expected, all of the reactors in this process had high VFA concentrations because of the short HRT, but it appeared there was no direct relationship between total VFA concentration and temperature. Because of higher alkalinities of the higher-temperature reactors, VFA/TALK ratios exhibited an inverse relationship with temperature. The preferred temperatures in the thermophilic regime are in a range of about 50° C. to 62° C.

Because of the perceived impact of feeding regime, i.e., semi-batch vs. semi-continuous, on fecal coliform removal, a statistical analysis was performed to determine significance. Semi-batch feeding showed slightly higher removals at 35° C. and 45° C., and semi-continuous feeding showed slightly higher removals at 50° C. and 55° C. An Analysis of Variance (ANOVA) test and a Tukey comparison showed that these differences were not statistically significant. However, the embodiment 1 data presented here includes only the semi-continuous feeding results for consistency and comparison to embodiment 2.

Fecal coliform log removal rates increased noticeably with temperature. At 50° C. and higher, average fecal coliform concentrations in the digested sludge were less than 1,000 MPN/g. TS, the fecal coliform requirement for Class A sludge. The 50° C. and 55° C. thermophilic reactors achieved removals greater than three logs. As previously noted, the fecal coliform removal was only for the first stage of a two-stage process. Inclusion of the second stage, mesophilic methane phase, of the first embodiment would likely result in removals which are higher in all temperatures regimes. Preferred mesophilic temperature regime is in a temperature range of about 28° C. to 38° C.

Embodiment 2

Single-Stage Thermophilic Digestion

As shown in Tables 1 and 2, pH and TALK values for each reactor were substantially higher for embodiment 2 than embodiment 1. VFA/TALK ratios were also proportionately greater at higher temperatures. Propionic acid appeared to accumulate in the higher-temperature reactors, 50° C. and 55° C., further increasing VFA/TALK values. VFA/TALKs at 50° C. and 55° C. were much greater than 0.1 mg VFA as acetic acid/mg TALK as $CaCO_2$, a standard benchmark for conventional mesophilic digesters.

During the initial period of embodiment 2 testing, much lower fecal coliform concentrations were measured in the reactor feed than were measured during the embodiment 1 evaluation. To determine if this decrease was significantly different from the expected values, a statistical Mann-Whitney test was performed on the feed sludge fecal concentrations. ANOVA was also performed but the data did not have a normal distribution. The results showed that fecal coliform concentrations in this initial period, log Fecals= 4.3606 xxx 0.7922, were significantly less than those that followed, log Fecals=5.1840 xxx 0.3977. The reduced concentrations in the beginning of the process were related to decreased frequency of fresh sludge feed. Subsequently, the frequency was increased, to daily, and the feed sludge fecal coliform concentrations recovered to their former levels. However, during this period the reduced concentration of feed sludge fecal Coliforms also decreased the removal rates, especially for the lower-temperature reactors. The feed sludge fecal coliform data at reduced levels is included in the embodiment 2 data in Table 2.

Figure 3:
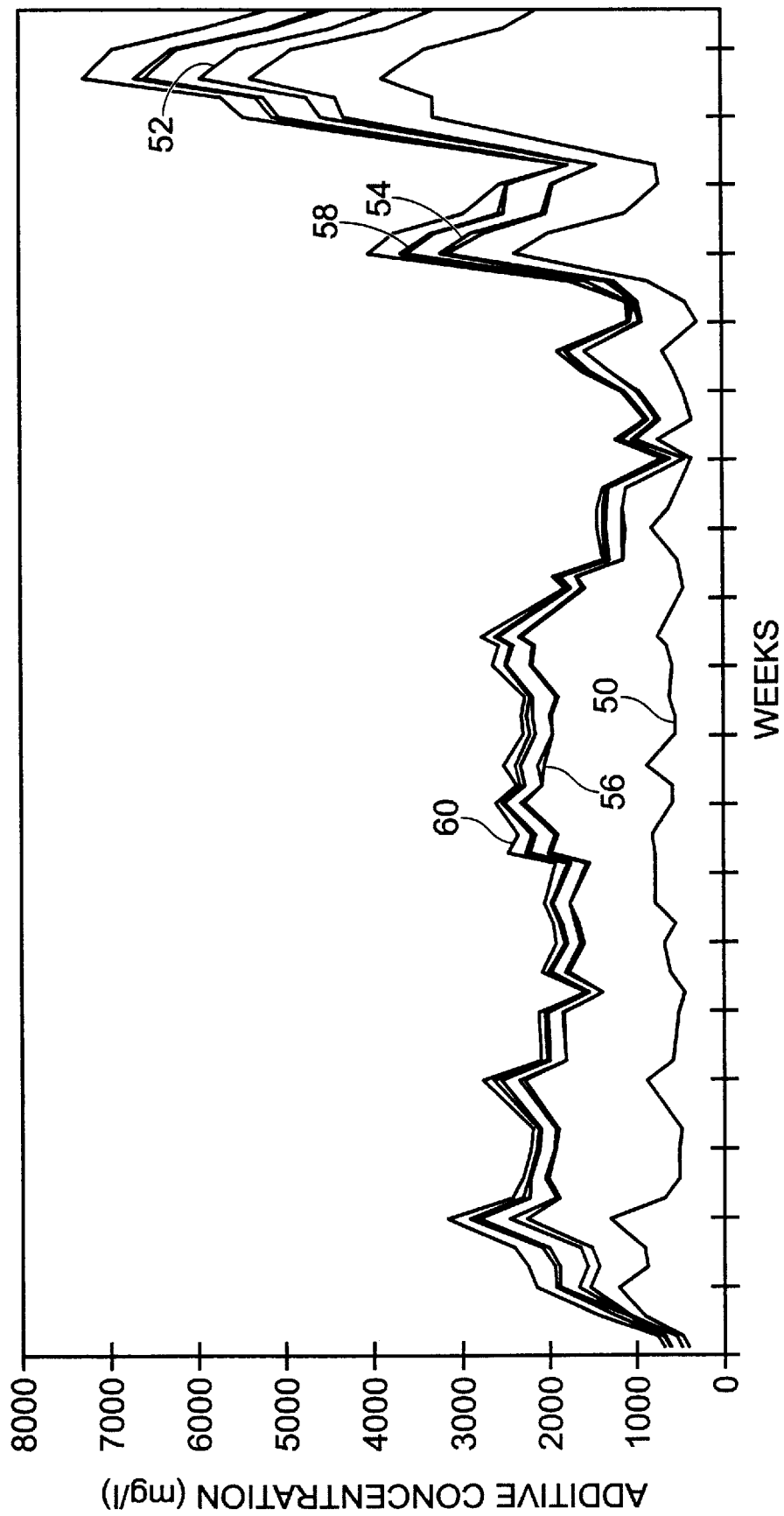
FIG. 3 depicts the distribution of fatty acids in the second embodiment of the invention at Thermo 55.

Toward the end of embodiment 2 testing, the VFA/TALK ratio for the 55° C. reactor increased to almost 1.0 mg acetic acid/mg CaCO3. As expected, this condition was accompanied by a drop in gas production and a lower methane concentration, although the pH remained relatively constant and the TALK concentration high. It is possible that propionic acid accumulation, as depicted in FIG. 3, Distribution of Fatty Acids in Thermo 55, embodiment 2", was not easily metabolized by the methanogenic bacterial populations under thermophilic conditions. FIG. 3 depicts levels of fatty acids over approximately twenty weeks of testing, corresponding to the data in Table 2. Trace 50 represents acetic acid, trace 52 represents butyric acid, trace 54 represents valeric acid, trace 56 represents propionic acid, trace 58 represents isobutyric acid, and trace 60 represents isovaleric acid. The actual operating temperature of Thermo 55 was 62° C. At this temperature, it appears that methanogenic activity is significantly impaired.

Fecal coliform log removal rates increased noticeably with temperature. At 45° C. and higher, embodiment 2 achieved 3–4 log removals of fecal coliform and average fecal coliform concentrations in the digested sludge were less than 1,000 MPN/g. TS, satisfying Class A sludge requirements. For embodiment 2, the preferred temperatures are in the range of 45° C. to 62° C. for the thermophilic reactor.

A summary of the conditions and results for the three embodiments are set forth in Table 3:

TABLE 3

|  | Temperature | | Mean | Std Dev | n | n < 1000 | % of time in compliance with Class A |
|---|---|---|---|---|---|---|---|
|  | Nominal | Actual |  |  |  |  |  |
| Embodiment 1 | 45° C. | 48° C. | 3.378 | 4.515 | 37 | 12 | 32 |
|  | 50° C. | 52° C. | 934.57 | 1516.94 | 37 | 27 | 73 |
|  | 55° C. | 62° C. | 339.43 | 971.74 | 37 | 32 | 86 |
| Embodiment 2 | 45° C. |  | 243.6 | 767.78 | 43 | 42 | 98 |
|  | 50° C. |  | 107.3 | 319.68 | 44 | 42 | 95 |
|  | 55° C. |  | 42.7 | 172.3 | 44 | 43 | 98 |
| Embodiment 3 | 35° C. |  | 706.9 | 1614.4 | 38 | 33 | 87 |
|  | 45° C. |  | 128 | 367 | 38 | 35 | 92 |
|  | 50° C. |  | 3.8 | 6 | 38 | 38 | 100 |
|  | 55° C. |  | 2.8 | 4.6 | 38 | 38 | 100 |

As previously noted, only the first stage thermophilic reactor was tested for embodiment 1 using a two-day HRT. Embodiment 2 at Thermo 45 and 55 and embodiment 3 at Meso 35 followed by Thermo 50, 55 produced significant results, meeting EPA Class A requirements 98% and 100% of the time, respectively. Sludge treated following the method of the invention as set forth in these embodiments is suitable, with respect to pathogen densities, for most applications where commercial fertilizers and soil conditioners are used.

A summary of the performance of the three embodiments is set forth in Table 4:

TABLE 4

|  | Embodiment 1 | | | Embodiment 2 | | | Embodiment 3 | | | |
|---|---|---|---|---|---|---|---|---|---|---|
| Temperature (° C.) | 48 | 52 | 62 | 45 | 50 | 55 | 35 | 45 | 50 | 55 |
| Pop. Mean < 1000 t calculated (All numbers are −ve) | Fail | 0.26 | 3.76 | 6.46 | 18.52 | 36.85 | 1.07 | 14.65 | 1023.5 | 1336 |
| degree of freedom |  | 35 | 35 | 40 | 40 | 40 | 40 | 40 | 40 | 40 |

TABLE 4-continued

| | | Embodiment 1 | | | Embodiment 2 | | | Embodiment 3 | | |
|---|---|---|---|---|---|---|---|---|---|---|
| Temperature (° C.) | | 48 | 52 | 62 | 45 | 50 | 55 | 35 | 45 | 50 | 55 |
| 4 @ 0.005 level (All numbers are −ve) | | | 2.724 | 2.724 | 2.705 | 2.705 | 2.705 | 2.705 | 2.705 | 2.705 | 2.705 |
| Fails/Succeeds (F/S) | | F | F | S | S | S | S | F | S | S | S |
| Interval | LCL | 1356* | 255** | 0 | 0 | 0 | 0 | 0 | 0 | 1.2 | 0.8 |
| | UCL | 5400* | 1614** | 834 | 561 | 237 | 113 | 1449 | 289 | 64 | 4.8 |
| Portion of Population Meeting Class A 90% of the Time | | | | | | | | | | | |
| z calculated | | N/A | N/A | N/A | 1.73 | 1.1 | 1.73 | N/A | 0.44 | 2.05 | 2.05 |
| p-value | | N/A | N/A | N/A | .0418 | .1357 | .0418 | N/A | 0.33 | .0202 | .0202 |
| Confidence Level (%) | | N/A | N/A | N/A | 95.82 | 86.43 | 95.82 | N/A | 67 | 97.98 | 97.98 |

*The 99% confidence interval for embodiment 1 population mean for fecal coliform densities @ 48° C. ranges from 1356 to 5400 MPN, which is well about the Class A limit of 1000 MPN/100 ml.
**At 52° C., this embodiment is a near miss, but should provide consistent compliance with EPA Class A when the mesophilic digester is added as a second stage.

Comparison of Process 1 and 2

Results from embodiment 1 and embodiment 2 testing were compared, and the results presented in Table 5.

TABLE 5

Statistical Similarities Among Embodiments 1 and 2
Average Fecal Coliform Log Concentrations

| Reactor | Embodiment 1 | Embodiment 2 |
|---|---|---|
| Meso 35 | 3.6871 ± 0.6407 | 2.9448 + 0.5927 |
| Thermo 45 | 3.1341 ± 0.6765 | 1.8011 ± 0.9091 |
| Thermo 50 | 2.0751 ± 1.1216 | 1.1986 ± 0.8145 |
| Thermo 55 | 1.6061 ± 1.0182 | 0.7232 ± 0.6693 |

A number of conclusions may be made regarding fecal coliform removals:
1. Longer residence times showed greater fecal coliform reductions.
2. A reactor operating at a 2-day HRT and 50° C. had a statistically similar ability to disinfect as a reactor operating at a 15-day HRT and 45° C.
3. A reactor operating at a 2-day HRT and 55° C. had a statistically similar ability to disinfect as a reactor operating at a 15-day HRT and 45° C. or 50° C.
4. Embodiment 2 showed significantly greater removals at thermophilic temperatures, although it must be noted that embodiment 2 had lower feed sludge concentrations and that embodiment 1 used only one stage of a two-stage process. Operation of the systems according to identical conditions for embodiments 1 and 2 would likely produce more similar removal rates.

From the results of embodiments 1 and 2, the following conclusions may be drawn:
1. Average effluent fecal coliform concentrations were less than 1,000 MPN/g. TS, meeting EPA 503 fecal coliform requirements for Class A treatment for embodiment 1 operating at 50° C. and 55° C.; and for embodiment 2 operating at 45° C., 50° C. or 55° C.
2. Embodiment 2 showed greater fecal coliform removals than embodiment 1 removals at the same temperature. However, adding a methanogenic second stage to embodiment 1 and more consistent feed sludge fecal coliform levels may reduce this difference.

Thus, three embodiments of a method for pathogen destruction has been disclosed. The second and third embodiments produce fecal coliform reductions in biosolids to a level sufficient to apply these treated biosolids in a manner similar to that of commercial fertilizers or soil conditioners. It will be appreciated that further variations and modifications thereof may be made within the scope of the invention as defined in the appended claims.

We claim:

1. A method of treating a waste stream comprising:

feeding a waste stream into a thermophilic anaerobic reactor maintained in a thermophilic temperature regime of between about 50° C. and 62° C., for a HRT of less than or equal to 48 hours;

drawing a portion of the contents of the thermophilic reactor and feeding the drawn contents into a mesophilic anaerobic reactor which is maintained in a mesophilic temperature regime of between about 28° C. to 38° C. for a HRT of at least thirteen days; and replacing the volume of the drawn contents from the thermophilic reactor by feeding the thermophilic reactor with a volume of waste from the waste stream.

2. The method of claim 1 which includes maintaining the reactor contents of the thermophilic reactor at a pH less than or equal to 6.5.

3. The method of claim 1 which includes maintaining the reactor contents of the mesophilic reactor at a pH of at least 6.5.

4. A method of treating a waste stream comprising:

feeding a waste stream into an anaerobic reactor maintained in a thermophilic temperature regime of between about 45° C. and 62° C., for a HRT of at least thirteen days, wherein the reactor contents are maintained at a pH of at least 6.5;

drawing a portion of the reactor contents; and replacing the volume of the contents removed from the reactor by feeding the reactor with more waste from the waste stream.

5. A method of treating a waste stream comprising:

feeding a waste stream into a mesophilic anaerobic reactor which is maintained in a mesophilic temperature regime of between about 28° C. to 38° C. for a HRT of less than or equal to 48 hours;

drawing a portion of the contents of the mesophilic reactor and feeding into a thermophilic anaerobic reactor maintained in a thermophilic temperature regime of between about 45° C. and 62° C., wherein the HRT in the thermophilic anaerobic reactor is at least thirteen days;

replacing the volume of the contents removed from the mesophilic anaerobic reactor by feeding the mesophilic anaerobic reactor with more waste from the waste stream.

6. The method of claim 5 which includes maintaining the reactor contents of the thermophilic reactor at a pH of at least 6.5.

7. The method of claim 5 which includes maintaining the reactor contents of the mesophilic reactor at a pH less than or equal to 6.5.

* * * * *